United States Patent [19]
Uhl

[11] Patent Number: 5,327,698
[45] Date of Patent: Jul. 12, 1994

[54] MOBILE ERECTABLE STAGE AND SOUND SHELL

[75] Inventor: Robert D. Uhl, Louisville, Ky.

[73] Assignee: Century Industries, Inc., Sellersburg, Ind.

[21] Appl. No.: 961,086

[22] Filed: Oct. 14, 1992

[51] Int. Cl.$^5$ .......................... E04H 3/10; E04H 3/28
[52] U.S. Cl. ............................................. 52/68; 52/7; 52/66; 52/144
[58] Field of Search .................... 52/7, 66, 68 OR, 69, 52/70, 144

[56] References Cited

U.S. PATENT DOCUMENTS

| | | | |
|---|---|---|---|
| 2,978,754 | 4/1961 | Wilson | 52/7 |
| 3,181,203 | 5/1965 | Wenger | 52/7 |
| 3,296,752 | 1/1967 | Philp | 52/70 |
| 3,534,997 | 10/1970 | Mitchell, Jr. | |
| 4,232,488 | 11/1980 | Hanley | 52/7 |
| 4,484,421 | 11/1984 | Williams et al. | 52/7 |
| 4,720,945 | 1/1988 | Berranger | 52/7 |
| 4,783,934 | 11/1988 | Langhart et al. | 52/7 |
| 4,875,312 | 10/1989 | Schwartz | 52/144 |
| 5,016,403 | 5/1991 | Fujita | 52/7 |
| 5,078,442 | 1/1992 | Rau et al. | 52/7 |
| 5,152,109 | 10/1992 | Boers | 52/66 |

Primary Examiner—Carl D. Friedman
Assistant Examiner—Wynn Wood
Attorney, Agent, or Firm—Middleton & Reutlinger

[57] ABSTRACT

A mobile erectable stage. In one preferred embodiment, in a stored condition, the stage has the form of a trailer which can be transported from one location to another. At least one bell crank assembly is used to erect the stage by raising at least one side wall panel and the interconnected roof panel, so that a stage with a sloped roof canopy which overhangs the stage floor is deployed. The stage floor can be enlarged by adding floor panels. The stage contains a powered light truss which extends out beyond the stage floor toward the audience to shine light back onto the stage. Further, the stage contains reversible acoustic panels, one side of which is used when the stage performers are using microphones to deflect audio waves to reduce possible echoing through the microphones and the other side of which is used when the stage performers are not using sound amplification. In another preferred embodiment, the stage has support columns which are extendable upward so that the erected stage has an elevated canopy. An improved stabilizer arm assembly is also provided which allows the stage to be supported better and elevated higher.

4 Claims, 7 Drawing Sheets

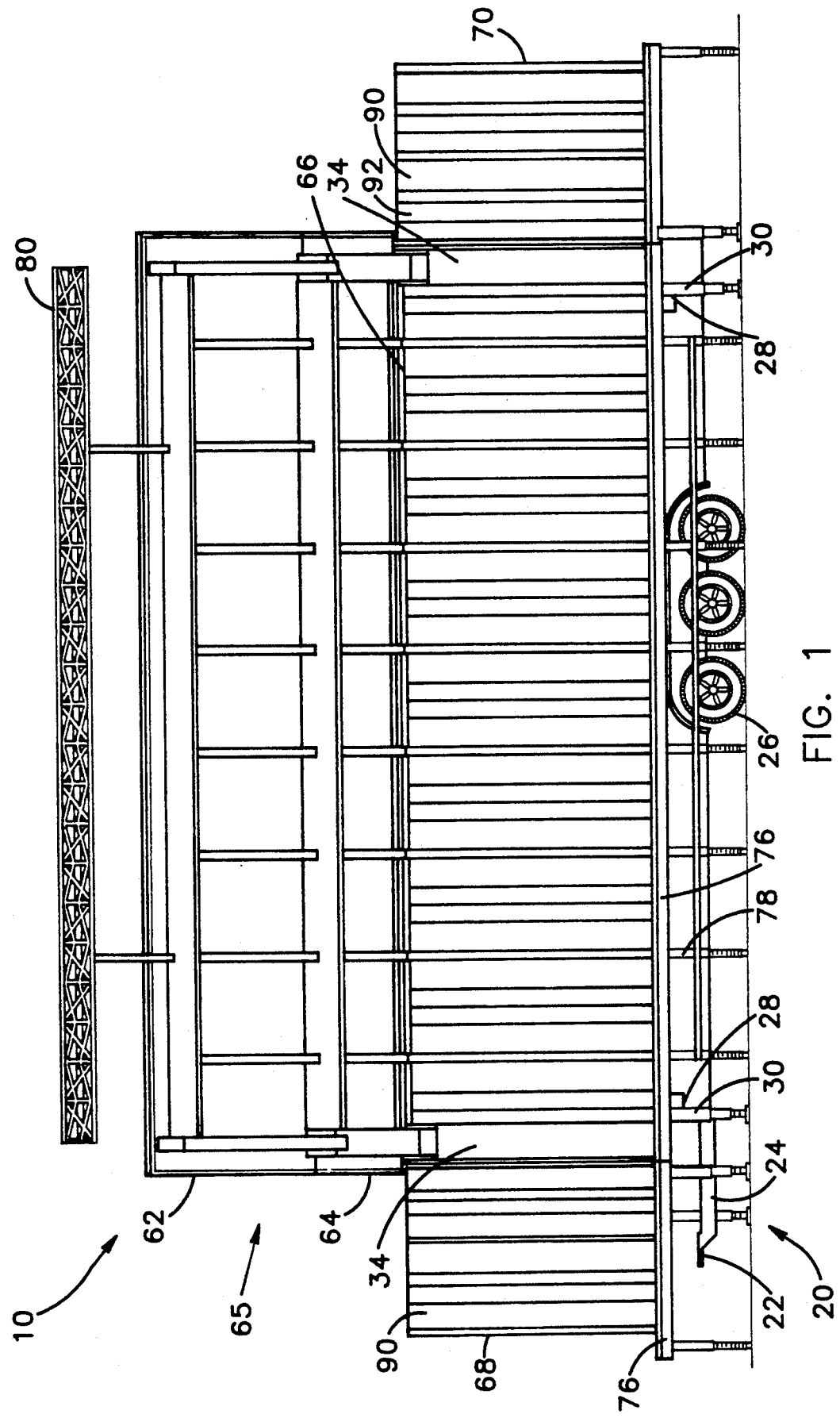

MOBILE ERECTABLE STAGE AND SOUND SHELL

BACKGROUND OF THE INVENTION (a) Field of the Invention

The present invention relates to a mobile erectable stage and sound shell, which can be easily stored when not in use. In the preferred embodiment, in a stored condition, the stage has the form of a trailer which can be transported from one location to another. At least one bell crank assembly is used to erect the stage by raising at least one side wall panel and the interconnected roof panel, so that a stage with a sloped roof canopy which overhangs the stage floor is deployed. The stage floor can be enlarged by adding floor panels. The stage contains an adjustable powered light truss which extends out beyond the stage floor toward the audience to direct light back onto the stage. Further, the stage contains reversible acoustic panels, one side of which is used when the stage performers are using microphones to deflect audio waves to reduce possible echoing through the microphones and the other side of which is used when the stage performers are not using sound amplification.

(b) Description of the Prior Art

There are known portable, expandable, and erectable stages, or rooms in the prior art. Some, when in a storage position, take the form of a trailer which can be transported from location to location.

U.S. Pat. No. 3,534,997, to Mitchell, teaches an expansible trailer which opens into a classroom-type structure. First, hinged floor extension units are deployed. Then pie-shaped rocker arms are pivoted a desired amount to cause the roof panels to open to the desired position. Hingedly attached panels are then manually positioned to form the room.

U.S. Pat. No. 5,078,442, to Rau et al., teaches a portable performance platform wherein a pair of standards 40, 42 each include an upright post member 44 and an inwardly angled cantilever arm 46. Piston and cylinder assemblies 54, 56 permit a pair of walls 32, 28 to be raised from a stowed position to multiple open stage positions by means of articulated support arms 48 attached to each cantilever arm 46. Because of the cantilever configuration, arms 48 and piston assembly 54 must be on opposite sides of the pivot point of arm 46. Therefore, this reduces the useable height of stage rear wall 30, and results in employment of sloped roof edge panel 74.

U.S. Pat. No. 4,875,312, to Schwartz, teaches a wall paneling for altering the acoustic properties of a wall. A plurality of hinged frames contain pivotally attached wall elements, each of which have a front and a rear face. Each face can have a particular sound-absorbent or sound reflective coating. The frames can be swung away from the wall and the desired face selected.

SUMMARY OF THE INVENTION

The present invention is for a mobile erectable stage and sound shell. In contrast to known stages, the stage of the preferred embodiment of the present invention employs a pair of bell crank assemblies for stage erection, thereby increasing the stage back wall height over known stages. Further, in another preferred embodiment, the pair of bell crank assemblies are each contained in a telescoping support column. In yet other embodiments, the stage further contains a deployable light truss. Also, stages of the present invention can include reversible acoustic panels, one side of which is to be used when a sound amplification system is used and another side which is to be used when no sound amplification system is used. Even further, pivotally connected outrigger jacks are provided which are on a slanted axis permitting the erected stage to be lifted higher off the ground.

Finally, the present invention comprises a mobile erectable stage, including: a chassis assembly, the chassis assembly having at least one support column extending upwardly therefrom, the at least one support column being of a preselected height; the at least one support column having a pivotally-connected bell crank; means to pivot said bell crank from a first position to a second position; a first roof panel hingedly-connected to the at least one support column at a top position of the at least one support column; a movable side/second roof panel hingedly-connected to the first roof panel; a first roof panel extender arm connected to the first roof panel and the bell crank; and, a movable side/second roof panel extender arm connected to the movable side/second roof panel and the bell crank.

BRIEF DESCRIPTION OF THE DRAWINGS

A better understanding of the present invention will be had upon reference to the following description in conjunction with the accompanying drawings, wherein:

FIG. 1 shows a front view of an erected stage of one preferred embodiment of the present invention;

DETAILED DESCRIPTION OF THE PREFERRED EMBODIMENT

Figure 2C:
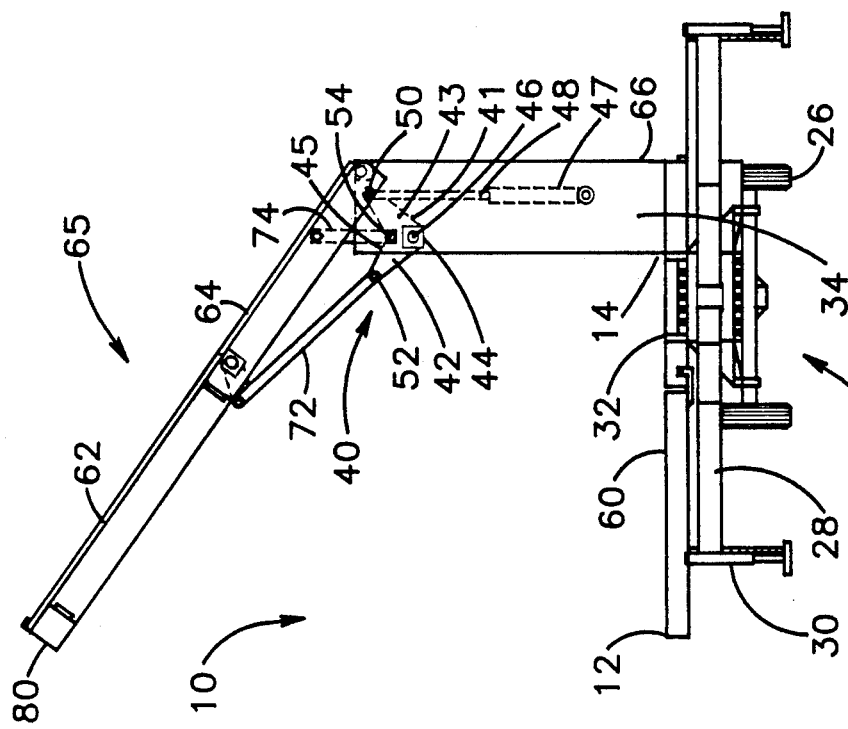
FIGS. 2a–c show the stage of FIG. 1 from the trailer end opposite the hitch end having the opposed hitch end panel removed for clarity, the figures showing the stage in a closed position, with stabilizer arms deployed, and in a fully erected position, respectively.
Figure 2B:
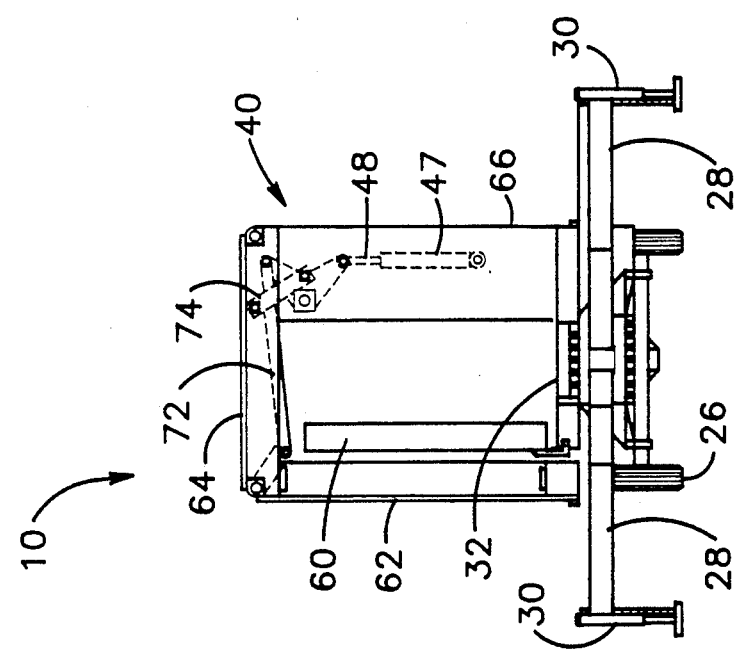
Figure 2A:
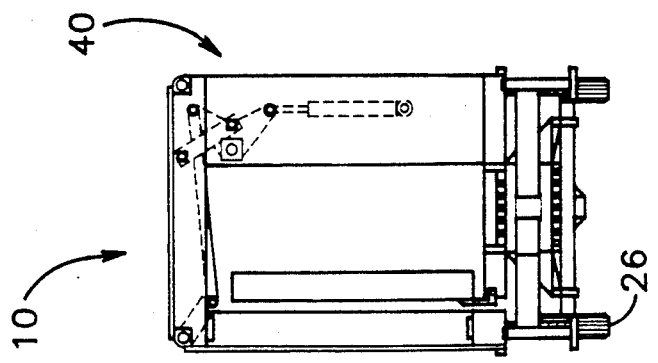
Figure 3:
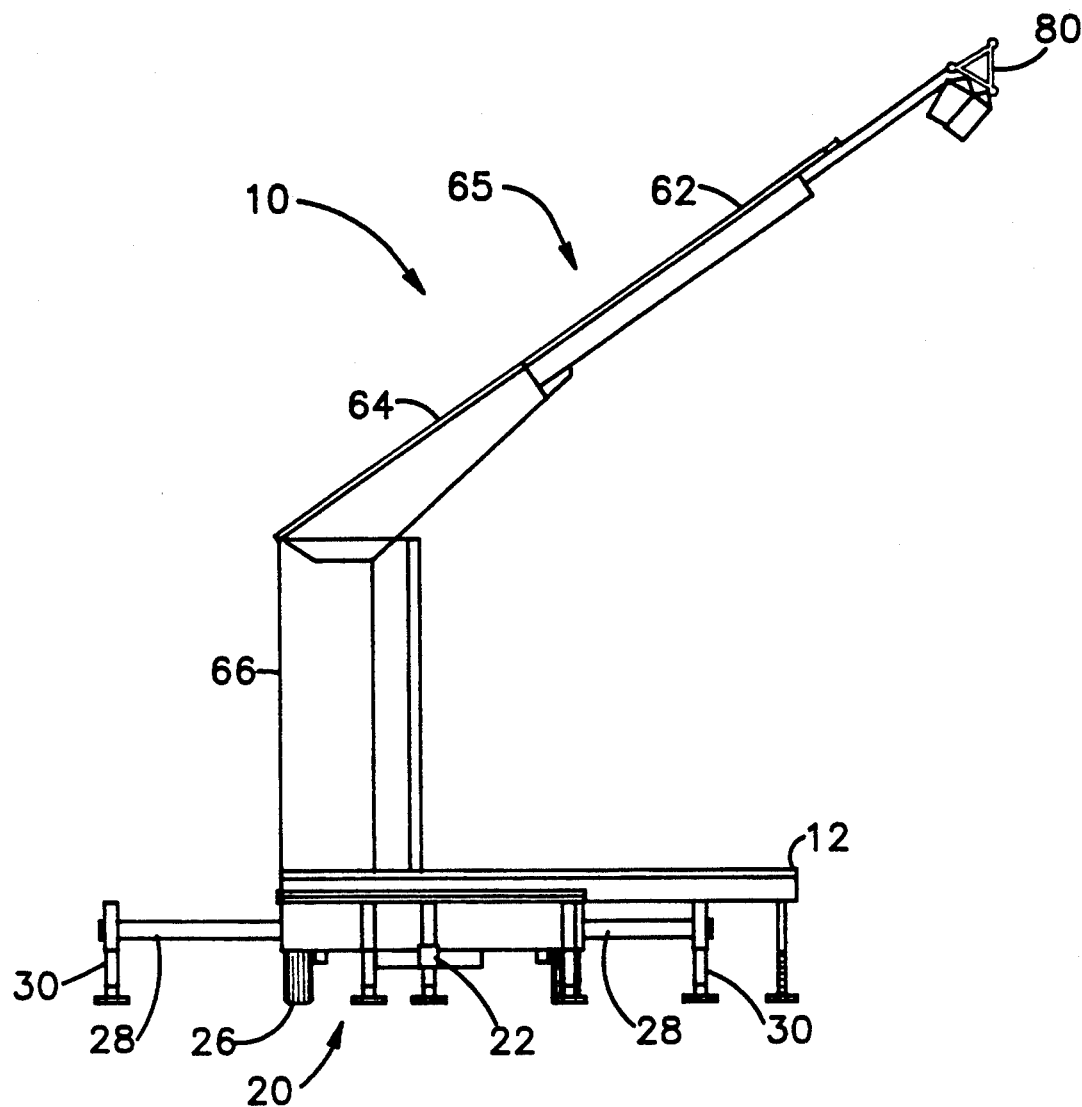
FIG. 3 shows the stage of FIG. 1 from the hitch end in a fully erected position with the light truss deployed.

With reference to FIGS. 1-3, there is shown a mobile erectable stage 10 of the present invention. In this preferred embodiment, FIG. 1 shows a front view of the erected stage 10; FIGS. 2a-c respectively show the stage 10 of FIG. 1 from the trailer end opposite the hitch 22 end in a closed position, with stabilizer arms 28 deployed, and in a fully erected position; and, FIG. 3 shows the stage 10 of FIG. 1 from the hitch 22 end in a fully erected position with the light truss 80 deployed.

Figure 10B:
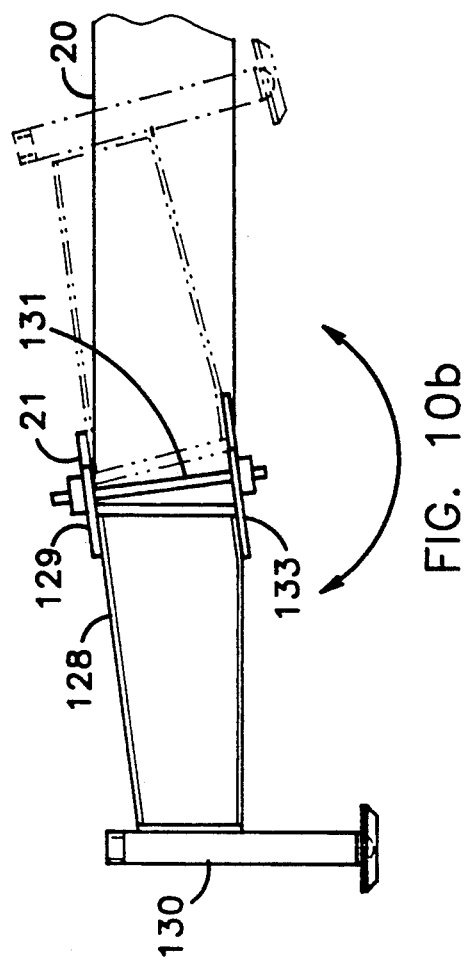
FIGS. 10a–c respectively show a perspective view, a side view, and a top view of a stage outrigger jack which can be employed with an erectable transportable stage of the present invention to provide adequate ground clearance when transporting the stage and to provide higher stage lift when the stage is erected.
Figure 10C:
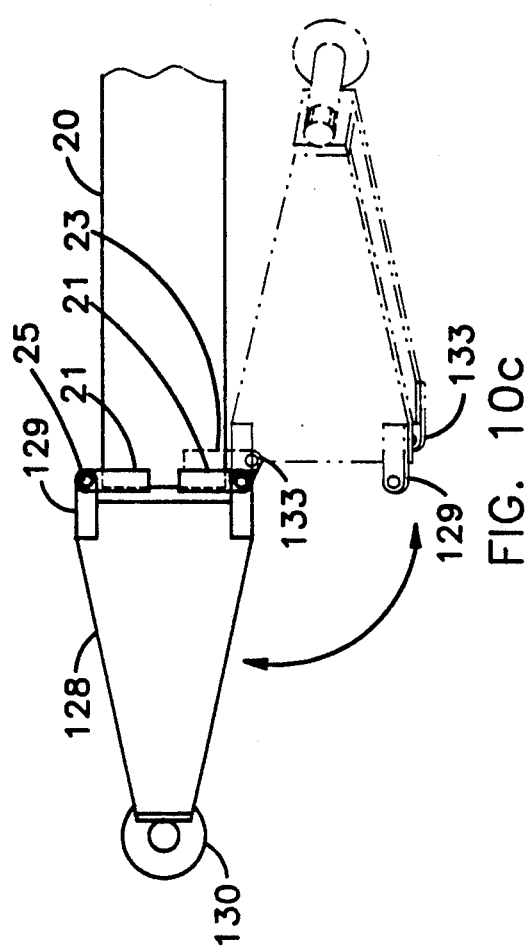
Figure 10A:
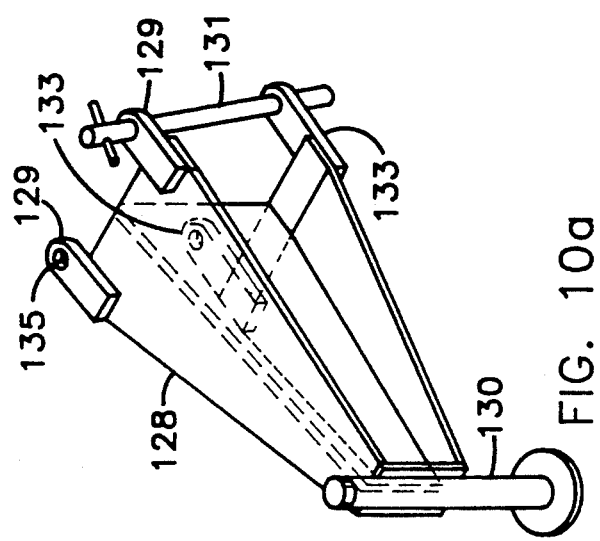

Stage 10 is shown in a trailer configuration, having a chassis assembly 20, comprising a hitch 22, trailer tongue 24, wheels 26, and deployable stabilizer arms 28 each having an adjustable jack 30. As shown, stabilizer arms 28 telescope out from chassis 20. However, stabilizer arms 28 could also be configured to be pivotally extendable from chassis 20, for example, as is shown in FIGS. 10a-c and discussed hereinafter. Further, instead of having stage 10 being towable by a separate vehicle, the vehicle could be integral with stage 10.

A fixed stage floor panel 32 is attached to chassis 20. In this preferred embodiment, a pair of support columns 34 are connected to chassis 20 and/or fixed stage floor panel 32 near the rear 14 of stage 10. Support columns 34 must be connected so that they will support the weight of deployed canopy 65, explained hereinafter. In this embodiment, stage 10 contains a fixed rear wall panel 66 which also engages support columns 34. Rear wall panel 66 is of a preselected height.

Movable stage floor panel 60 is hingedly attached to fixed stage floor panel 32 and is in a vertical position when stage 10 is closed, as shown in FIG. 2a, and in a horizontal position when stage 10 is open, as shown in FIG. 2c. Panel 60 can be manually lowered from the vertical to horizontal position or can have mechanical or hydraulic means, for example, not shown, which can be used to move panel 60 between the vertical and horizontal positions. Panel 60, in the horizontal position is supported along the hinge line by the hinge and at the front by swing down adjustable support legs.

Additionally, as shown in FIG. 1, stage 10 contains a hitch end panel 68 and an opposed hitch end panel 70 which are hingedly attached to opposite ends of rear wall panel 66. When stage 10 is in a closed position, panels 68 and 70 swing inward to face each other and are perpendicular to rear wall panel 66. When stage 10 is in an open position, panels 68 and 70 can be swung outward to the desired performing position. As shown, panels 66, 68, and 70 are in an alined configuration.

A plurality of floor extension panels 76 can be connected at the front 12 of stage 10 and at the sides of stage 10 floor panels 32 and 60 to increase the stage floor area. Panels 76 have support means 78 which provide proper alignment and support for the panels 76.

Figure 4:
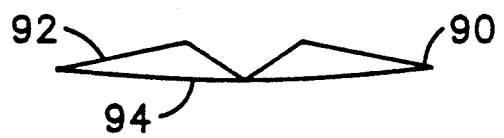
FIG. 4 shows a cross-section view of a reversible acoustic panel.

FIG. 1 shows panels 66, 68, and 70 having a plurality of reversible acoustic panels 90 securable thereto. Panels 90 are shown with first side 92 facing the audience. FIG. 4 shows a vertical cross-section view of one of the acoustic panels 90. Panels 90 are geometrically designed for strength, as they are often handled by personnel erecting stage 10. First side 92 is designed to face the audience when a sound amplification system is being used on the stage 10. The configuration shown is designed to cause sound waves to reflect away from the performer's microphone to improve the amplified sound quality received by the audience by decreasing the chance that sound waves will reflect off first side 92 and be heard as an echo. When no sound amplification system is employed, second side 94 can face the audience. With this configuration, the geometric shape of second side 94 generally causes sound waves to be reflected toward the audience.

With reference back to FIGS. 1-3, stage 10 is shown having a first roof panel 64 which is hingedly connected to rear wall panel 66. Alternatively, first roof panel 64 can be hingedly connected to support columns 34 near column 34's top rearward position. A movable side/second roof panel 62 is hingedly connected to first roof panel 64. When stage 10 is erected for performances, as will be explained hereinafter and as is shown in FIGS. 1 and 2c, first roof panel 64 and movable side/second roof panel 62 form a canopy 65 which extends over floor panels 32 and 60. When stage 10 is in a closed configuration for storage or transportation, as is shown in FIG. 2a, first roof panel 64 forms the roof of the stage 10 trailer and movable side/second roof panel 62 forms one side of the stage 10 trailer opposite rear wall panel 66.

FIGS. 2a-c show stage 10 being erected from its closed to open configurations by a pair of bell crank assemblies 40, each bell crank assembly 40 being supported within one of support columns 34. The use of bell crank assemblies 40 overcome deficiencies in other transportable, erectable stages which, because of the height limitations for transportation and because of the cantilever-type erection assemblies employed, result in a reduced height for the stage rear wall. As is seen, with stage 10, rear wall panel 66 is a "full-height" panel, limited only by highway height limits and not by the employed erection assembly.

As shown, for example, butterfly-shaped bell crank 41 has a left wing 42 and a right wing 43. Bell crank assemblies 40 are hydraulically-operated by a single control means, not shown, for example. Other known means can be employed to operate the bell crank assemblies. Bell crank 41 has a support column pivot point 46, substantially midway between left wing 42 and right wing 43 and toward the bottom 44 of bell crank 41. Bell crank 41 is rotatably connected to its respective support column 34 at this location 46. Hydraulic cylinder 47 has a piston 48 extending from one end. The other end of hydraulic cylinder 47 is rotatably connected to its respective support column 34. Piston 48 extending from cylinder 47 is rotatably connected to right wing 43 of bell crank 41 near its outer topmost position, identified by location 50. Movable side/second roof panel extender arm 72 is rotatably connected to left wing 42 of bell crank 41 near its outer, topmost position, identified by location 52. Arm 72 is also pivotally connected to movable side/second roof panel 62 near where panel 62 and first roof panel 64 are hingedly connected. Bell crank 41 has a first roof panel extender arm 74 rotatably connected to it at a location identified by the numeral 54, being substantially midway between left wing 42 and right wing 43 and toward the top 45 of bell crank 41. Arm 74 is pivotally connected to first roof panel 64.

The lengths of extender arms 72 and 74 and their connection points to panels 52 and 54, respectively, are determined by the geometric shape and slope angle desired for canopy 65 when stage 10 is fully erected, such as is shown in FIG. 2c, for example. FIG. 2c shown that bell crank 41 has rotated through approximately ninety degrees counterclockwise from its position shown in FIG. 2a. In doing this rotation, bell crank 41 has caused panels 62 and 64 to become alined to form canopy 65. It is also noted that in this configuration, canopy 65 is somewhat self-locking, as the weight of panels 62 and 64 form a thrust line through respective extender arms 52 and 54 to pivot point 46.

By altering the length of extender arms 72 and 74 and their connection points to panels 52 and 54, respectively, and their connection points 52 and 54, respectively, on bell crank 41, many other desired configurations are possible. Many other desired configurations are also possible by changing the degrees of rotation of bell crank 41. As examples of the types of changed configurations possible, the slope of canopy 65 can be increased or decreased and panels 62 and 64 can be configured so that when stage 10 is erected, panels 62 and 64 are in a desired non-alined configuration.

While other known stages have lights in their canopy, these lights shine onto the heads of the on-stage performers, and external spot-like lights must be employed to provide proper front lighting for the on-stage performers. As is seen in FIGS. 1 and 3, stage 10 has a deployable light truss 80, which solves this problem. Light truss 80 is slidably contained with movable side/second roof panel 62. As shown, light truss 80 telescopes from panel 62, but it could also swing out from panel 62. When stage 10 is being erected, the single control means, not shown, is activated to cause hydraulic cylinders 47 to extend their respective pistons 48 and thereby cause their respective bell cranks 41 to rotate in a counter-clockwise direction, when viewed as seen in FIGS. 2a-c. This causes panel 62 containing light truss 80 to swing out away from fixed floor panel 32. When panel 62 has been swung out so enough so that light truss 80 can be telescoped out from panel 62 to its desired position, the control means is stopped and light truss 80 is properly positioned. It is noted that light truss 80 is multi-positional so that it can be set for the desired alignment. The control means is then reactivated to fully erect the stage 10 to its open position, as seen in FIGS. 1 and 3. Also, stage 10 and light truss 80 are designed so that additional lights can be attached to truss 80, if necessary. While not shown, truss 80 can be configured so that it can be extended from panel 62 and the lights adjusted while stage 10 is fully erected by employing additional hydraulics and control means, for example.

Figure 5:
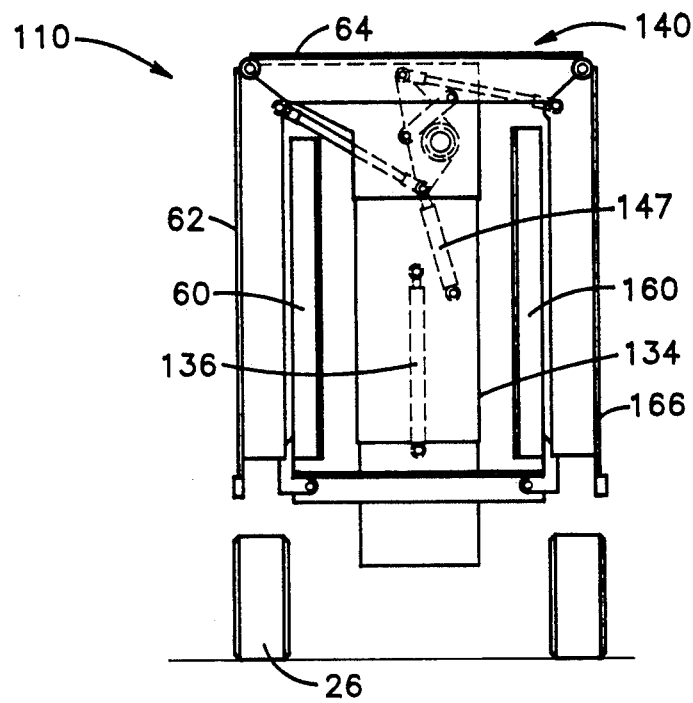
FIG. 5 shows another preferred stage of the present invention having a movable rear wall panel and extendable or telescoping support columns, the stage having separate means to erect the stage canopy and extend the support columns, the stage being shown in a closed position.
Figure 6:
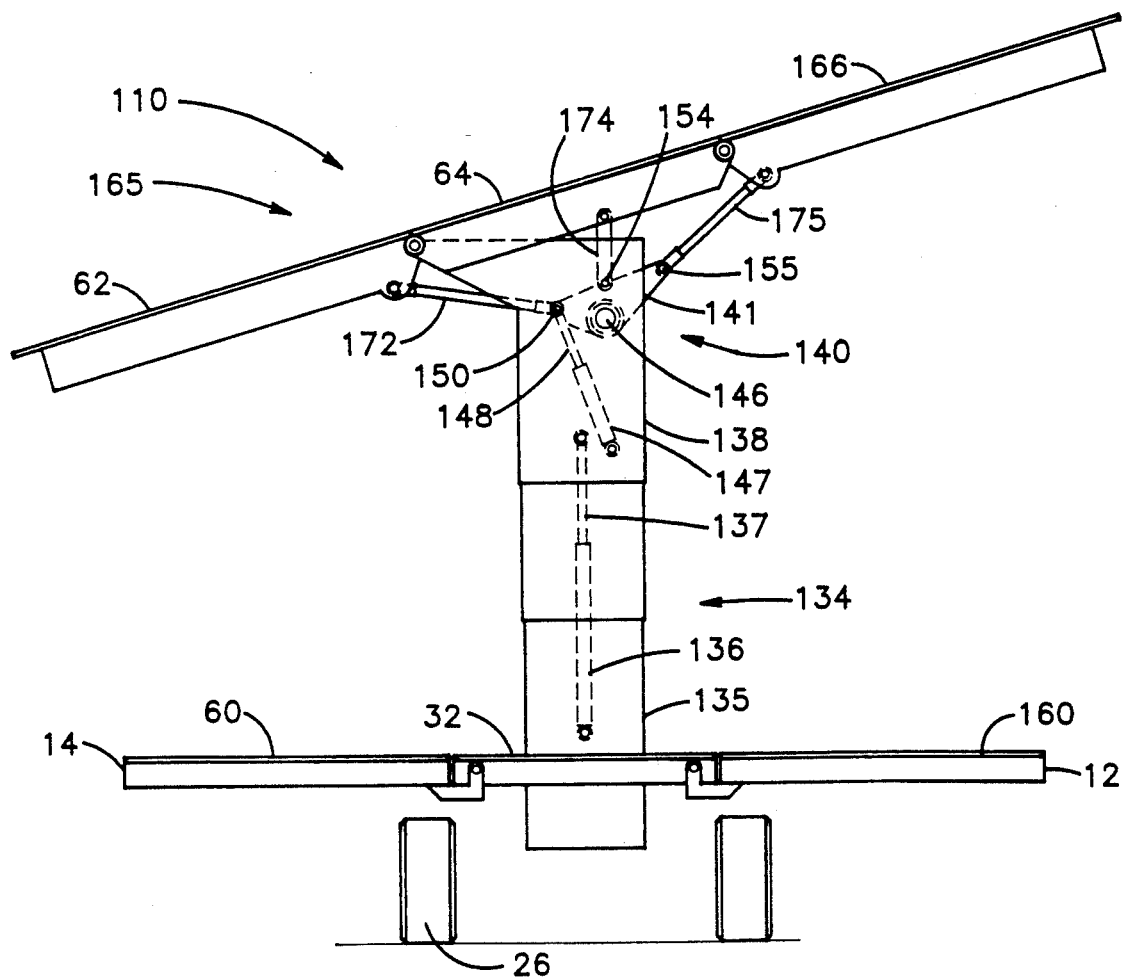
FIG. 6 shows the stage of FIG. 5 in a fully erected position.

FIGS. 5 and 6 show another preferred stage 110 in closed and fully erected positions, respectively. Stage 110 has a movable side/third roof panel 166 and extendable or telescoping support columns 134 having a bottom 135 section and a top 138 section. This permits stage 110, as shown in FIG. 5, to be more easily transportable height-wise, but yet have a higher canopy 165 when erected over a stage without a telescoping column, as shown in FIG. 6. Stage 110 is shown having a movable stage floor panel 60 hingedly attached to fixed stage floor panel 32 at the stage rear 14 portion and a second movable stage floor panel 160 hingedly attached to fixed stage floor panel 32 at the stage front 12 portion thereof.

Stage 110, as shown in FIG. 6, has canopy 165, formed by alined panels 62, 64, and 166. However, as was explained with the discussion of stage 10 of FIGS. 1-3, the geometry of the stage is determined by the length of the various extender arms and their points of attachment to the bell crank and the respective panel.

In stage 10 of FIGS. 1-3, rear wall panel 66 is fixedly attached to support columns 34 and first roof panel 64 is hingedly attached to rear wall panel 66 near panel 66's highest point. In stage 110 of FIGS. 5 and 6, movable side/second roof panel 62 and first roof panel 64 are hingedly attached to support columns 134 near the top rear of columns 134. Columns 34 of stage 10 of FIGS. 1-3 were toward the rear 14 of stage 10. Columns 134 of stage 110 may also be positioned toward the rear 14 of stage 110 or moved forward to be in a substantially centered position between stage front 12 and stage rear 14, as shown, for example. Movable side/third roof panel 166 is pivotally attached to first roof panel 64. A movable side/second roof panel extender arm 172 is connected from panel 62 to the bell crank 141 of bell crank assembly 140 at position 150; a first roof panel extender arm 174 is connected from panel 64 to bell crank 141 at position 154; and, a movable side/third roof panel extender arm 175 is connected from panel 166 to bell crank 141 at position 155.

In operation, to erect the stage 110 from the closed position shown in FIG. 5 to the fully erected position shown in FIG. 6, first hydraulic control means, not shown, is activated to cause hydraulic cylinder 147 to extend piston 148, thereby rotating bell crank 141 about pivot 146 and causing panels 62, 64, and 166 to become alined, thereby forming canopy 165. Hydraulic cylinder 147 is connected to top section 138 of column 134 and piston 148 is connected to position 150 of bell crank 141. Second hydraulic control means, not shown, is then activated to cause second hydraulic cylinder 136 connected to bottom section 135 of column 134 to extend piston 137 connected to top section 138 of column 134 and thereby cause support columns 134 to telescope upward until canopy 165 is at the desired height above the stage 110 floor comprising panels 32, 60, and 160.

Figure 7:
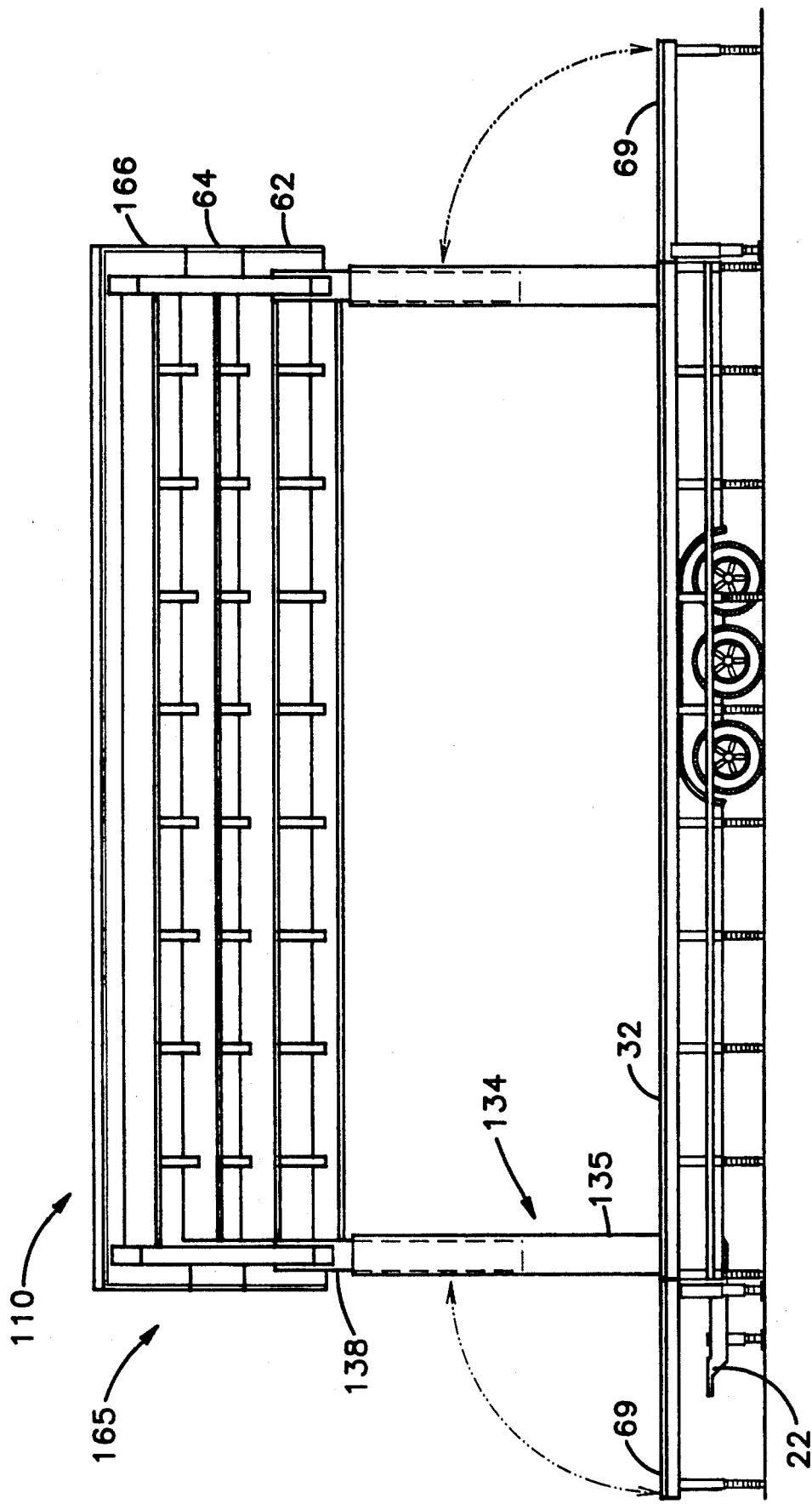
FIG. 7 is a front view of the stage of FIGS. 5 and 6 having a pair of hingedly connected stage end panels.

FIG. 7 shows a front view of the stage 110 of FIGS. 5 and 6 in an erected condition. Stage 110 of FIG. 7 includes a pair of stage floor end panels 69 hingedly connected to fixed stage floor panel 32, one panel 69 being hingedly connected to panel 32 at the hitch 22 trailer end and the other panel 69 being connected at the end opposite the hitch 22 end. As with the stage 10 of FIGS. 1-3, additional floor extension panels can be added to expand the floor of stage 110. Further, a light truss 80 can be included. In stage 110 of FIGS. 5-7, a light truss 80 would be deployable from panel 166.

Figure 8:
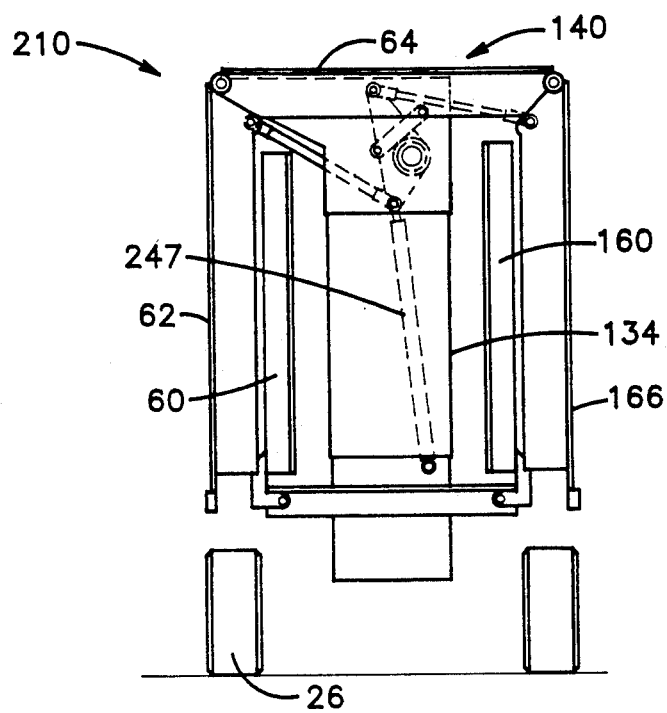
FIG. 8 shows another preferred stage of the present invention having a movable rear wall panel and extendable or telescoping support columns, the stage having combined means to erect the stage canopy and extend the support columns, the stage being shown in a closed position.
Figure 9:
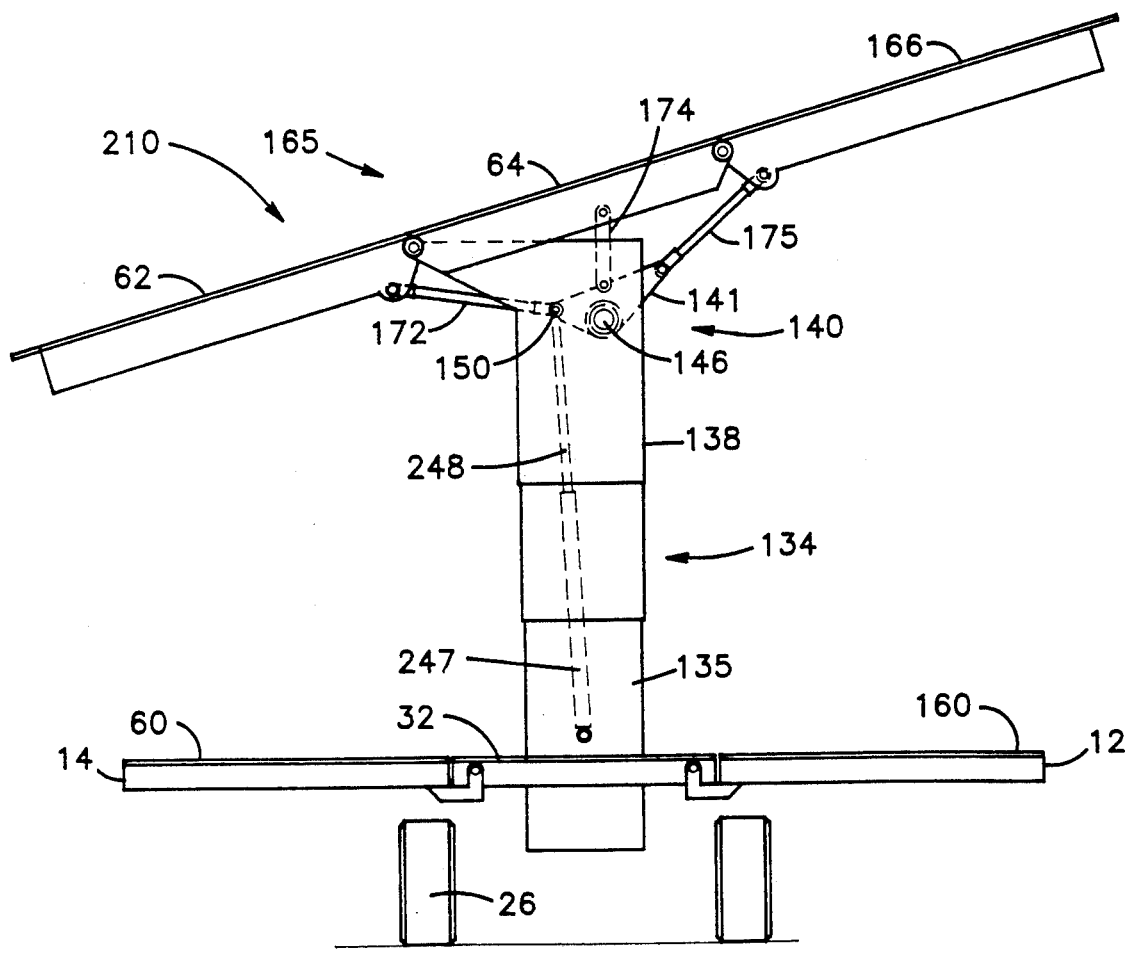
FIG. 9 shows the stage of FIG. 8 in a fully erected position.

FIGS. 8 and 9 show another preferred stage 210 in closed and fully erected positions, respectively. The stage 110 of FIGS. 5-7 employed first and second hydraulic control means to respectively cause panels 62, 64, and 166 to become alined to form canopy 165 and cause support columns 134 to telescope upward until canopy 165 is at the desired height above the stage 110 floor. In contrast, in stage 210 of FIGS. 8 and 9, a single control means, not shown, is activated to cause a hydraulic cylinder 247 connected to bottom section 135 of column 134 to extend piston 248 connected to bell crank 141 at position 150. Extending piston 248 rotates bell crank 141 about pivot 146 to cause panels 62, 64, and 166 to become alined to form canopy 165 and also causes support columns 134 to telescope upward until canopy 165 is at the desired height above the stage 210 floor comprising panels 32, 60, and 160. Otherwise, stage 110 of FIGS. 5-7 and stage 210 of FIGS. 8 and 9 are identical.

As previously described, the stabilizer arms 28 each having an adjustable jack 30, as shown in FIGS. 2a-c, telescope horizontally out from chassis 20. However, this configuration presents design limitations, particularly with respect to the maximum length of adjustable jack 30. The stage floor deck limits the upper end of jack 30 and the required road clearance for transportation limits the lower end of jack 30. This in turn limits how high off the ground the stage can be lifted. Not only is it preferable to elevate the stage sufficiently to lift the stage wheels off the ground to improve stage stability by having all stage weight supported at the stage outer edges, it is also preferable to elevate the stage as high off the ground as possible so that the stage performers are easier for the audience to see. The outrigger stabilizer arm jack assembly 128, as shown in FIGS. 10a-c, is pivotally connected to chassis 20 and alleviates these design limitations.

By having stabilizer arm 128 of FIGS. 10a-c pivotally attached to chassis 20, stabilizer arm 128 can be mounted to swing in a non-horizontal line from its transportation position to its erected stage position. This is best shown in FIG. 10b. Stabilizer arm 128 has an adjustable outrigger jack 130 attached at one end and two top chassis connecting plates 129 and two bottom chassis connecting plates 133 attached at the other end, for example. Each plate 129 and 133 has a bore 135 therethrough for receiving an attachment rod 131.

Chassis 20 has top and bottom connecting plates 21 and 23, respectively, connected at each position where an arm 128 will be pivotally attached by attachment rods 131. Each of plates 21 and 23 has a bore 25 therethrough for receiving an attachment rod 131. Bottom plates 23 are more central to chassis assembly 20 than top plates 21 to aid in the non-horizontal pivotability of arm 128. This configuration, along with the geometric configuration of arm 128, and in particular plates 129 and 133, cause attachment rods 131 to have a central axis which is skewed from the vertical and, thereby, permits each arm 128 to be positioned in an erected stage position, shown on the left side of FIGS. 10b-c, wherein the outrigger jack 130 is vertical so that it can properly support the weight of the stage, and also permits each arm 128 to be positioned in a transportation position, shown on the right side of FIGS. 10b-c, wherein the outrigger jack is much higher off the ground than in the erected stage position.

One attachment rod 131 is fixedly attached through bores 135 in a plate 129 and a plate 133 and through bores 25 in a plate 21 and a plate 23. The other attachment rod 131, not shown, is removably attachable in a likewise manner when the arm is in the erected stage position, shown on the left side of FIGS. 10b-c. To move to arm 128 from the erected stage position to the transportable position, shown on the right side of FIGS. 10b-c, the removably attachable rod 131 is removed and the arm 128 is pivoted around the axis of the fixedly attached rod 131. Means should also be provided to ensure that arm 128 cannot pivot while in the transportable position.

By employing arms 128 of FIGS. 10a-c, in the transportation position, increased ground clearance of outrigger jack 130 is obtained. Further, as arms 128 do not have to be tucked under the stage floor for transportation, the length of each jack 130 can be increased significantly. This results in an ability to lift the stage much higher off the ground when arms 128 are in their erected stage position.

Many other configurations which will accomplish the same skewed or off-vertical axis are possible. For example, plates 129 and 133 could be unitary with arm 128 with arm 128 having attachment bores therein. Also, plates 21 and 23 could be unitary with chassis 20 having attachment bores therein. Further, fixedly attached rod 131 and removably attachable rod 131 could each be replaced by a pair of attachment pins.

With the stages 10, 110, and 210 shown in FIGS. 1-9, at least four arms 128 would be employed. When facing a stage of the instant invention at the hitch 22 end, arms 128 would be attached at the hitch end left and right edges and the non-hitch end left and right edges. The connection shown in FIG. 10c would be used for the hitch end right edge and the non-hitch end left edge. A mirror image connection would be employed for the hitch end left edge and the non-hitch end right edge. This minimizes the trailer width in a transportation mode.

The foregoing detailed description is given primarily for clearness of understanding and no unnecessary limitations are to be understood therefrom for modifications can be made by those skilled in the art upon reading this disclosure and may be made without departing from the spirit of the invention and scope of the appended claims.

What is claimed is:

1. A mobile erectable stage, comprising:
   a. a chassis assembly, said chassis assembly having at least one support column extending upwardly therefrom, said at least one support column being of a preselected height; said at least one support column having a pivotally-connected bell crank;
   b. a first roof panel, wherein said first roof panel includes a deployable illuminating truss;
   c. a first roof panel extender arm connected to said first roof panel and said bell crank; and,
   d. means to pivot said bell crank, which, when activated, causes said first roof panel extender arm to move said first roof panel.

2. A mobile erectable stage, comprising:
   a. a chassis assembly, said chassis assembly having at least one support column extending upwardly therefrom, said at least one support column being of a preselected height; said at least one support column having a pivotally-connected bell crank;
   b. a first roof panel;
   c. a first roof panel extender arm connected to said first roof panel and said bell crank;
   d. means to pivot said bell crank, which, when activated, causes said first roof panel extender arm to move said first roof panel;
   e. a movable side/second roof panel hingedly-connected to said first roof panel, wherein said movable side/second roof panel hingedly-connected to said first roof panel includes a deployable illuminating truss; and,
   f. a movable side/second roof panel extender arm connected to said movable side/second roof panel and said bell crank;
   wherein, said means to pivot said bell crank, when activated, also causes said movable side/second roof panel extender arm to move said movable side/second roof panel.

3. A mobile erectable stage, comprising:
   a. a chassis assembly, said chassis assembly having at least one extendable support column extending upwardly therefrom, said at least one extendable support column having a pivotally-connected bell crank;
   b. a first roof panel, wherein said first roof panel is hingedly-connected to said at least one extendable support column at a top position of said at least one extendable support column;
c. a first roof panel extender arm connected to said first roof panel and said bell crank;
d. means to extend said at least one extendable support column upward from a preselected lowest position;
e. means to pivot said bell crank, which, when activated, causes said first roof panel extender arm to move said first roof panel;
f. a movable side/second roof panel hingedly-connected to said at least one extendable support column at said top position of said at least one extendable support column;
g. a movable side/third roof panel hingedly-connected to said first roof panel, wherein said movable side/third roof panel hingedly-connected to said first roof panel includes a deployable illuminating truss;
h. a movable side/second roof panel extender arm connected to said movable side/second roof panel and said bell crank; and,
i. a movable side/third roof panel extender arm connected to said rear wall panel and said bell crank;
wherein said means to pivot said bell crank, when activated, also causes said movable side/second roof panel extender arm to move said movable side/second roof panel and said movable side/third roof panel extender arm to move said movable side/third roof panel.

4. A mobile erectable stage, comprising:
a. a chassis assembly, said chassis assembly having at least one support column extending upwardly therefrom;
b. a stage roof canopy, said stage roof canopy connected to said at least one support column; and,
c. a deployable illuminating truss contained by said stage roof canopy and deployable therefrom.

* * * * *